Feb. 1, 1955
D. M. MYERS
2,700,899
APPARATUS FOR MEASURING THE VELOCITY
OF A STREAM OF MOVING GASEOUS MEDIUM
Filed Sept. 22, 1952
2 Sheets-Sheet 2
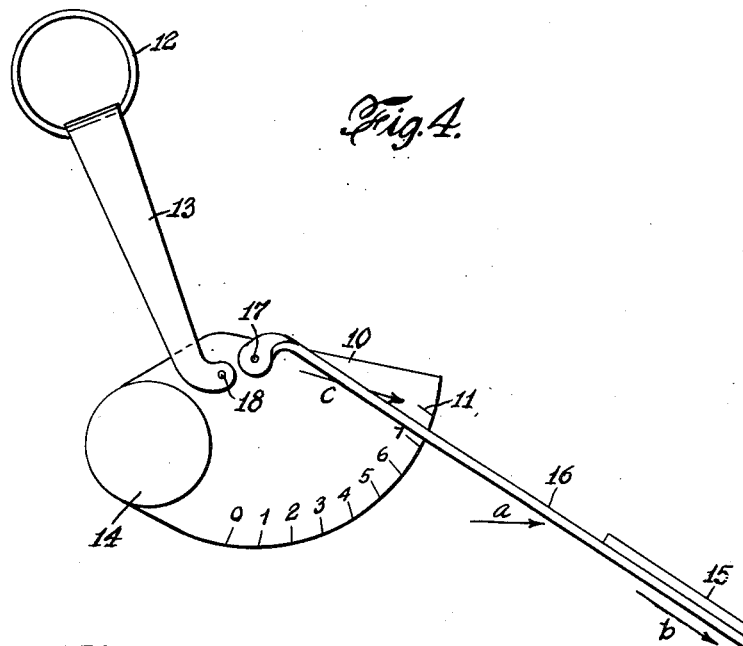
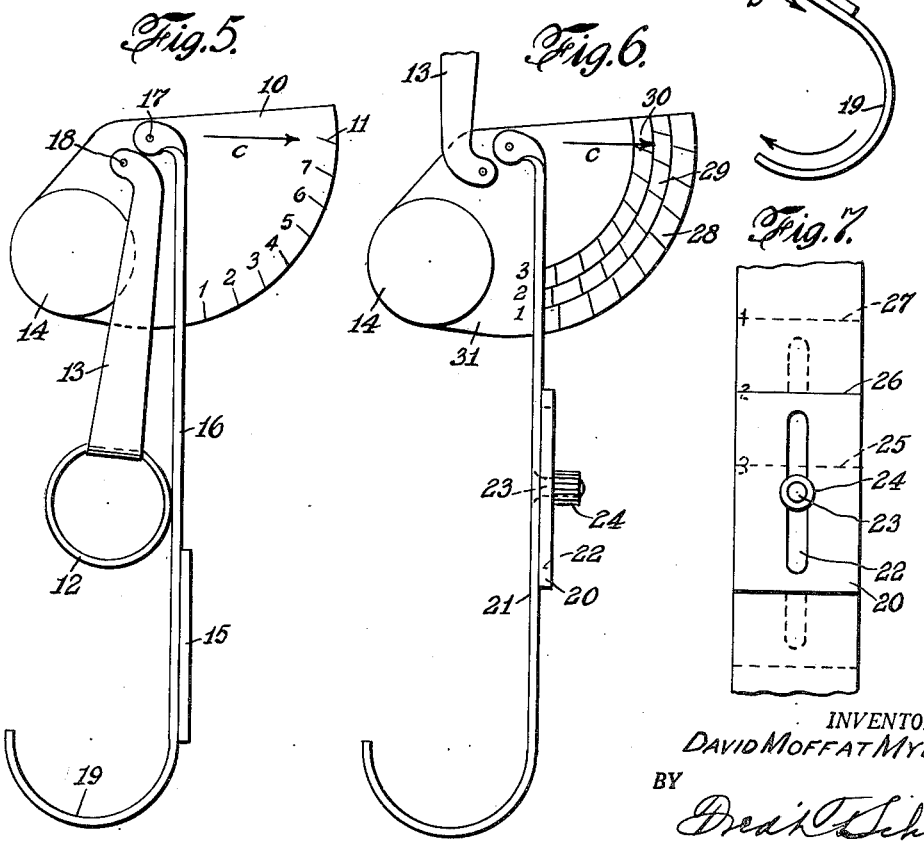
INVENTOR.
DAVID MOFFAT MYERS
BY
ATTORNEY.

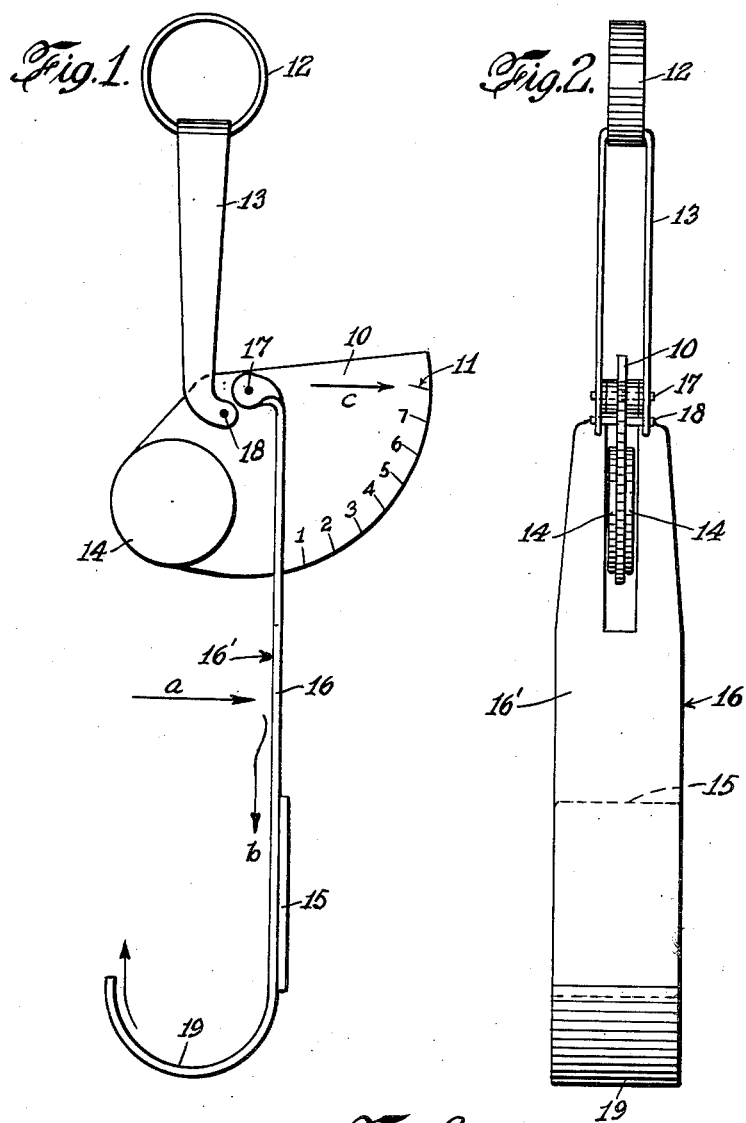

United States Patent Office 2,700,899
Patented Feb. 1, 1955

2,700,899

APPARATUS FOR MEASURING THE VELOCITY OF A STREAM OF MOVING GASEOUS MEDIUM

David Moffat Myers, Larchmont, N. Y.; The Hanover Bank and Henry M. Myers, executors of said David Moffat Myers, deceased Application September 22, 1952, Serial No. 310,772

5 Claims. (Cl. 73—228)

The invention relates to measuring apparatus, more especially to a device for measuring the velocity or impact pressure of a stream of moving gaseous medium, such as wind velocity.

The invention has for an object to provide a relatively inexpensive and reliable measuring device of the aforesaid nature which is of small size and conveniently manipulable to afford a visual indication of the velocity of a moving stream of gaseous medium; also, to provide a construction which will admit of conveniently folding the device into a compact unit suitable for storage and/or transportation.

It has for a further object to provide a wind velocity measuring device of simple construction and which will afford an accurate indication when held in the flowing gaseous stream.

A still further object of the invention is to provide a construction which will admit of multiplication of forces exerted by the flowing stream on said device to afford thereby a relatively open scale on an indicator quadrant of the device.

Another object of the invention is to provide a device of the aforesaid nature which may be constructed in such a manner as to be adaptable readily to different ranges of measurement, as well as one which will afford, generally, maximum spacings of the scale over the most active portion thereof.

In carrying out the invention, the novel measuring device is designed to be located in a flowing gaseous stream as in suitably suspending the same so that a vane element thereof will be positioned in a plane substantially normal to the direction of flow. The suspension is such that a graduated plate or quadrant, suitably weighted, is caused to swing in a plane normal to the plane of impingement of the gaseous stream, but is held normally under the action of gravity in a definite zero position indicated on said quadrant as part of a suitably calibrated scale.

There is associated with the said graduated plate or quadrant, as by pivotal attachment thereto at a point displaced laterally from the point of suspension of the said plate, the angularly movable impact or swingable vane element designed to swing over the face of the plate to cooperate with the graduated scale thereon. This impact element is likewise held to the zero position under the action of gravity when the medium has zero velocity, and its lower free end may be curved on the windward side substantially to a semicircle to afford an impact blade. By this expedient, a component of the velocity of the impinging gaseous stream directed downwardly over the face of the vane element exerts a downward pull at the curved portion or blade to accentuate the angular deflection of said vane member and of the measuring quadrant and thus make for more accurate reading over the scale of the quadrant. By suitably weighting both the quadrant and the vane element suspended from the same, various ranges of graduations may be provided for the quadrant element to accommodate the device to various velocity ranges.

The nature of the invention, however, will best be understood when described in connection with the accompanying drawings, in which:

Fig. 1 is a front elevational view of the novel velocity measuring device, and Fig. 2 is a side elevation thereof.

Fig. 3 is a plan view of the device.

Fig. 4 is a view illustrating the action of the novel measuring instrument in indicating the velocity of a flowing gaseous medium.

Fig. 5 is an elevational view illustrating the instrument compactly folded.

Fig. 6 is a fragmentary front elevation and Fig. 7 a similar side elevation illustrating a modification in the measuring device.

Referring to the drawings, the novel measuring device is indicated as comprising a plate or quadrant 10 provided along its circumference with graduations affording a scale 11 calibrated, for example, to gaseous media velocities—in miles per hour or according to Beaufort wind forces—of a flowing stream in which the device is to be suspended for measurement of such velocities. The suspension may be effected as from a manipulating element including a holding ring 12 and intermediate U-shaped link element 13 rigidly secured to the bottom of said ring. The said ring is suited for digital or other support of the device in positioning it in a flowing stream.

The outer ends of the legs of the suspension element 13 have pivotally secured between them the said quadrant 10, as is indicated in the drawings, and the said quadrant may be weighted as by means of a weight 14 carried thereon to suspend the said quadrant under the action of gravity in a predetermined zero location. However, this location is controlled, as will hereinafter be set forth, also by a further balance weight 15 secured to a suitable vane member or bar 16. The upper and bifurcated end of the bar embraces and is pivotally secured at 17 to the quadrant 10 such that the bar is substantially at right angles to the faces of the quadrant, with edges of said bar juxtaposed to and movable over the quadrant for cooperation with the graduations thereon. The indication of the degree of displacement under impact of the flowing stream—indicated by the arrow a—will thus be a measure of the velocity of said flowing stream, such deflection being a function thereof and of any effect on the quadrant edge.

The suspension point 17, moreover, is displaced from the suspension point 18 of the quadrant to effect a multiplication in the travel of the vane member over the quadrant graduations when a downward force is exerted on the vane member and thus admit of wider divisions of the scale 11. This is effected by utilizing any downward component $b$ of the velocity component $a$ of a stream of flowing gaseous medium directed against the impact face 16' of the vane member, particularly by providing the lower end of vane 16 as a turbine blade 19 or the like. For example, it may be bent downwardly and outwardly into a substantial semicircle so that such component will impinge against said blade portion to exert a downward pull through the vane member on the quadrant about the suspension point 18 as a fulcrum and with leverage represented by the distance between the suspension points 17 and 18, and thus will amplify the deflection due merely to the normally impinging component $a$, as is indicated in Fig. 4 of the drawings.

Different ranges may be provided for, also, by changing the location of the suspension point 17 to vary the leverage effect aforesaid. Furthermore, the largest calibrations on the scale may thus be made to correspond with the most usual wind velocities, for example, in a 30 M. P. H. model, or any other desired range.

By changing in the original assembly the balance weights 14 and 15 to heavier ones, the instrument will measure winds of higher maximum velocities. By substituting lighter balance weights, a more sensitive instrument results for a lower velocity range. Thus, by changing the balance weights, the measuring device may be calibrated for any desirable range of velocities to give large-scale readings at those measurement speeds most desired. In making such changes, the weights are so related to each other that zero reading is obtained with zero wind velocity.

Or, provision may be made whereby the same quadrant may carry several calibrations, it being necessary then to make, for example, the weight carried by the vane longitudinally adjustable thereon. Thus, reference being had to Figs. 6 and 7, the weight 20 on the vane 21 is provided with a longitudinal slot 22, and a flat-headed pin 23 extends from the windward side through the slot and is threaded at its opposite portion to receive a clamping nut 24 for securely holding the weight in a selected position on the vane. Three such positions are indicated by the lines 25, 26 and 27; and corresponding scales 28, 29 and 30 are provided then on the quadrant 31. Of course, the vane could be slotted rather than weight, but it is preferred to maintain the windward surface smooth and unbroken.

It will be noted, also, that the quadrant, when so located in a gaseous stream as to afford a maximum reading, registers then the direction of said stream, as indicated by the arrow c; and the strength of a component at any selected direction may also thus be directly determined. For example, on an artillery range, the force or velocity of wind acting at right angles to the trajectory can be secured independently of the actual direction of the wind by holding the instrument so that the plane of vane 16 is in line with the range.

I claim:

1. Means for measuring the velocity of flow of a gaseous medium, comprising: an indicator element including a graduated oscillatable quadrant plate, and means pivotally attached to the upper portion of said plate to suspend it about a horizontal axis whereby said plate may be positioned edgewise in a flowing stream of the medium; an elongated, pendulum-mounted vane element, the lower end of which terminates in a blade directed toward the flow to receive downward components of the flow velocity diverted thereto from the vane impact surface when the measuring means is inserted in the flowing stream and to develop thereby a downward thrust which is transmitted by said vane to the quadrant plate to swing the latter; and means to suspend pivotally said vane element at its upper end from the quadrant plate for oscillation about a horizontal axis and at a point laterally displaced from the point of suspension of said plate to cooperate with the graduations thereon, whereby there will be imparted both to the vane element and cooperating quadrant plate angular movement in the measuring plane and in opposite directions effecting a separation therebetween to afford a measurement.

2. The measuring means according to claim 1, wherein said suspension means is an inverted U-shape element, and the legs thereof are attached to said plate and separated sufficiently to pass the entire quadrant plate therethrough for folding the measuring means compactly.

3. The measuring means according to claim 1, wherein the quadrant plate is weighted to displace its center of gravity laterally and the vane element is weighted to counterbalance said vane to provide a zero reading thereof on the quadrant plate.

4. Means for measuring the velocity of flow of a gaseous medium, comprising a pendulum-supported measuring quadrant plate for suspension edgewise in a flowing stream; and a vane element pendulum-supported thereon and having a portion to swing over the face thereof and a portion extending below the lower edge of the quadrant plate with face at right angles to the plate, and the point of suspension of the vane element being displaced vertically from that of the quadrant plate and in the direction of flow of the gaseous medium whereby the impact of flow on said vane element will impart to the quadrant plate angular movement in the sense opposite to that imparted to said vane element.

5. The measuring means according to claim 4, wherein the vane element terminates in a blade extended at its lower end toward the flow, thereby to accentuate the angular movement of the quadrant plate.

References Cited in the file of this patent

UNITED STATES PATENTS

| 1,626,216 | Stratton | Apr. 26, 1927 |
| 2,389,603 | Dollinger | Nov. 27, 1945 |
| 2,491,176 | Hammond | Dec. 13, 1949 |

FOREIGN PATENTS

| 4,693 | Great Britain | 1910 |
| 808,289 | Germany | July 12, 1951 |